US008916285B2

(12) United States Patent
Frutschy et al.

(10) Patent No.: US 8,916,285 B2
(45) Date of Patent: Dec. 23, 2014

(54) MODULAR HIGH TEMPERATURE BATTERY ELECTRICAL CONFIGURATIONS

(75) Inventors: Kristopher John Frutschy, Clifton Park, NY (US); Reza Sarrafi-Nour, Clifton Park, NY (US); Stefan Rakuff, Clifton Park, NY (US); Sandor Istvan Hollo, Menands, NY (US); Narayan Subramanian, Schenectady, NY (US); William Patrick Waters, Scotia, NY (US); James Thorpe Browell, Clifton Park, NY (US); Kanthi Latha Bhamidipati, Glenville, NY (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 13/338,325

(22) Filed: Dec. 28, 2011

(65) Prior Publication Data

US 2013/0171507 A1    Jul. 4, 2013

(51) Int. Cl.
*H01M 2/10*    (2006.01)
*H01M 2/22*    (2006.01)
*H01M 2/30*    (2006.01)

(52) U.S. Cl.
USPC ............................ 429/158; 429/159; 429/178

(58) Field of Classification Search
None
See application file for complete search history.

(56) References Cited

U.S. PATENT DOCUMENTS

2002/0006544 A1* 1/2002 Asaka et al. .................... 429/99
2008/0145746 A1  6/2008 Zappi et al.
2010/0062329 A1* 3/2010 Muis ........................... 429/158
2011/0064993 A1* 3/2011 Ochi ........................... 429/158
2011/0171505 A1* 7/2011 Kishll et al. ................... 429/82
2012/0301765 A1* 11/2012 Loo et al. ..................... 429/100

FOREIGN PATENT DOCUMENTS

| CN | 101752614 A | 6/2010 |
| DE | 19538003 A1 | 4/1996 |
| GB | 2294803 A | 5/1996 |
| WO | 2009016335 A1 | 2/2009 |
| WO | 2010085474 A1 | 7/2010 |
| WO | WO 2011/086772 * | 7/2011 |

OTHER PUBLICATIONS

Search Report and Written Opinion from corresponding PCT Application No. PCT/US2012/068550 dated Apr. 8, 2013.

* cited by examiner

*Primary Examiner* — Jonathan Crepeau
(74) *Attorney, Agent, or Firm* — GE Global Patent Operation; Peter T. DiMauro

(57) ABSTRACT

A cell module and modular cell tray apparatus for a modular electrochemical device that are more easily manufactured and serviced. A cell module is provided having a plurality of electrochemical cells. The cell module includes an electrically conductive carrier element having a plurality of apertures, wherein each aperture is configured to accept a top portion of an electrode body of an electrochemical cell. A modular cell tray apparatus is provided having a plurality of the cell modules. The cell tray apparatus includes an electrically insulating tray having rows of cell receptacles to accept the cell modules. A modular electrochemical device is provided having a plurality of the cell tray apparatuses. The modular electrochemical device includes a plurality of electrical connectors configured to electrically connect the cell modules within a cell tray apparatus, and to electrically connect the cell tray apparatuses to each other.

31 Claims, 17 Drawing Sheets

500

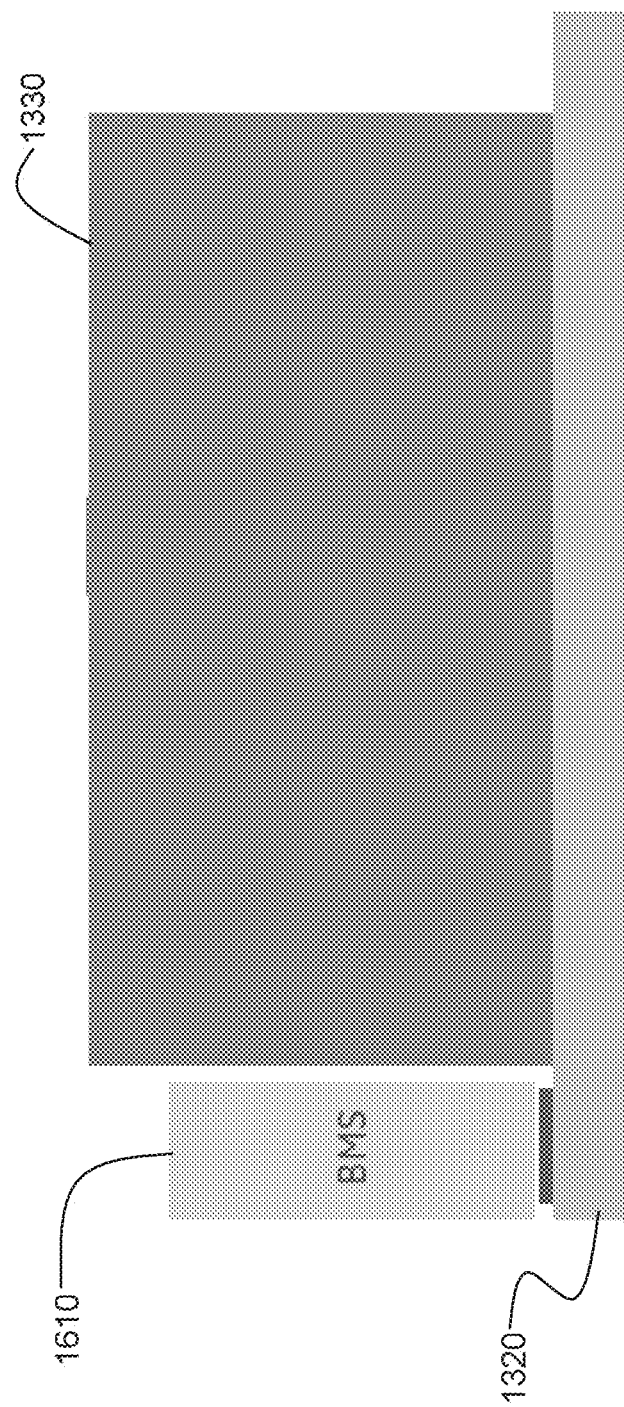

MODULAR HIGH TEMPERATURE BATTERY ELECTRICAL CONFIGURATIONS

BACKGROUND

1. Technical Field

Embodiments of the subject matter disclosed herein relate to batteries. Other embodiments relate to modular electrical configurations for multi-cell array batteries.

2. Discussion of Art

Battery configurations for high temperature applications often rely on a battery interconnect pattern to build up battery voltage, capacity, and current within a string of cells that are then connected to an electrical bus. The pattern is often unique for each battery application and has to be changed for each new application. Furthermore, other configuration features related to thermal aspects, cooling aspects, and wire and bus bar routing may be impacted as well. Such custom configurations for new applications can make designing, manufacturing, and maintenance more difficult and time-consuming.

It would therefore be desirable to develop a battery configuration with features and characteristics that make the battery configuration more easily manufactured and serviced versus battery configurations that are currently available.

BRIEF DESCRIPTION

In an embodiment, a cell module for an electrochemical device is provided having a plurality of elongate electrochemical cells each having a first electrode protruding out of a top portion of a second electrode body. The cell module also provides an electrically conductive elongate carrier element having a first plurality of apertures, wherein each aperture is configured to accept a top portion of a second electrode body of a cell of the plurality of cells therethrough. The second electrode body of each cell is welded to the carrier element at a corresponding aperture of the first plurality of apertures.

In an embodiment, a modular cell tray apparatus for an electrochemical device is provided having a plurality of the cell modules disclosed above herein. The cell tray apparatus also provides an electrically insulating tray having rows of cell receptacles. Each row of cell receptacles is configured to receive and support at least a bottom portion of the cells of a cell module of the plurality of cell modules.

In an embodiment, a modular electrochemical device is provided having a plurality of the cell tray apparatuses disclosed above herein. The modular electrochemical device also provides a first plurality of electrical connectors configured to electrically connect the plurality of cell modules within each cell tray apparatus of the plurality of cell tray apparatuses. The modular electrochemical device further provides a second plurality of electrical connectors configured to electrically connect the plurality of cell tray apparatuses.

BRIEF DESCRIPTION OF THE DRAWINGS

Reference is made to the accompanying drawings in which particular embodiments of the invention are illustrated as described in more detail in the description below, in which:

FIG. 16 is an illustration of an embodiment of a battery management system (BMS) mounted to the base plate of the modular electrochemical device of FIG. 13.

DETAILED DESCRIPTION

Figure 1:
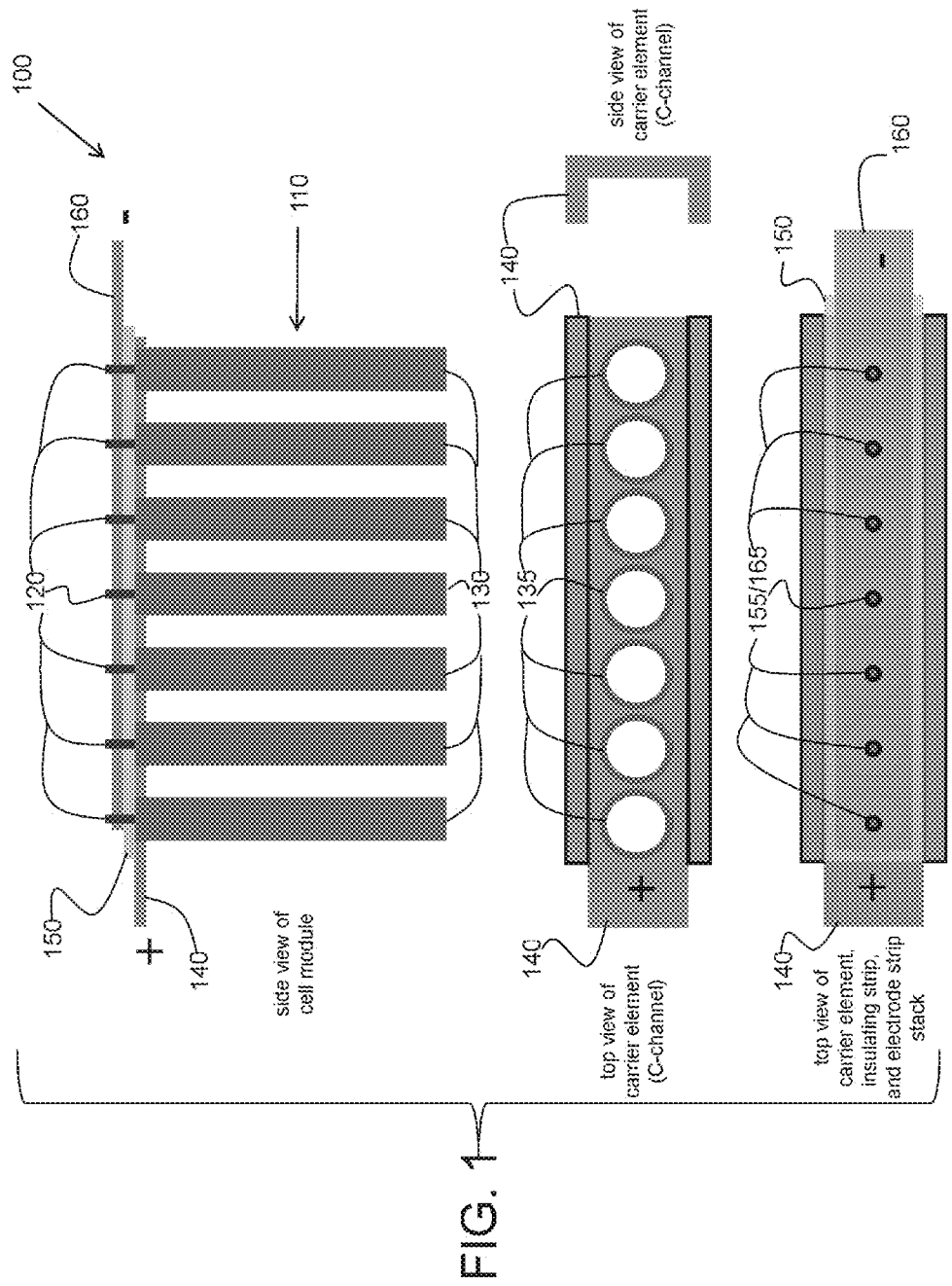
FIG. 1 is an illustration of several views of a first embodiment of a cell module for an electrochemical device.

Embodiments relate to electrical interconnections for multi-cell array batteries that are operated at high temperatures (e.g., 300° C. or more). The electrical interconnections are modular such that electrochemical devices of various configurations providing various levels of voltage and capacity can be readily configured.

With reference to the drawings, like reference numerals designate identical or corresponding parts throughout the several views. However, the inclusion of like elements in different views does not mean a given embodiment necessarily includes such elements or that all embodiments of the invention include such elements.

Figure 2:
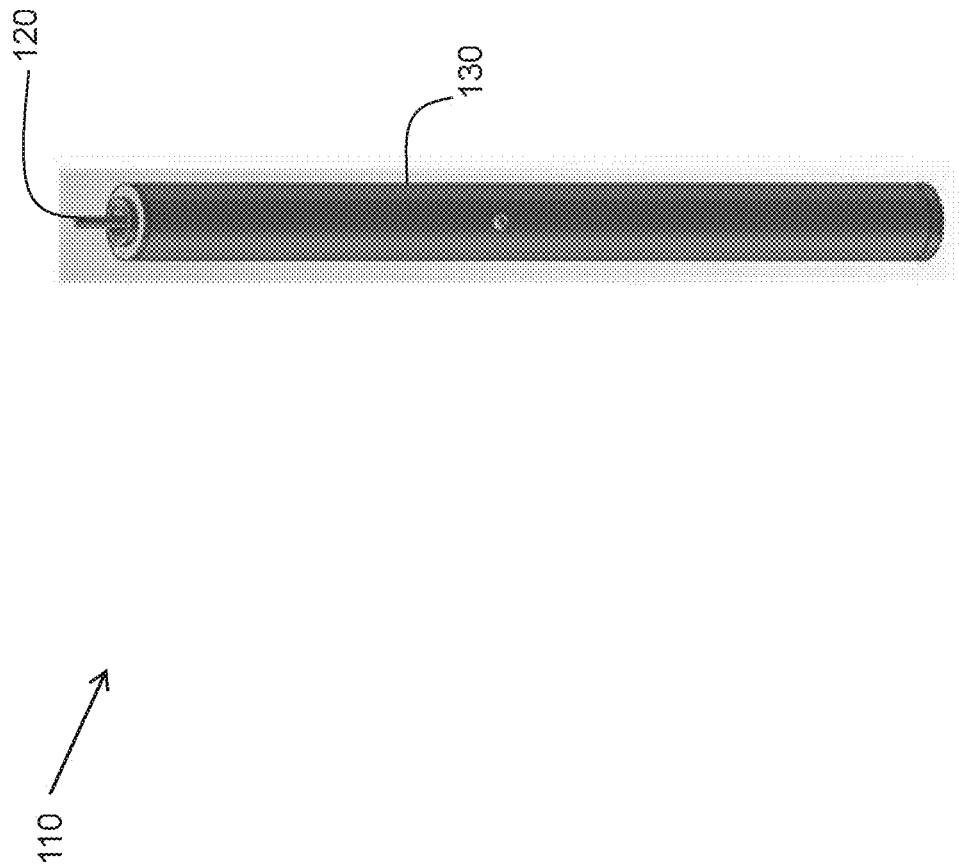
FIG. 2 is an illustration of an embodiment of a cylindrically shaped cell.

FIG. 1 is an illustration of several views of a first embodiment of a cell module 100 for an electrochemical device. The cell module 100 includes a plurality of electrochemical cells 110 (e.g., the cells may be elongate) each having a first electrode 120 (e.g., a negative anode) and a second electrode 130 (e.g., a positive cathode). In an embodiment, the first electrode protrudes out of a top portion of a body of the second electrode 130. FIG. 2 is an illustration of an embodiment of a cylindrically shaped cell 110 having a circular cross-section. In the exemplary embodiment, each cell 110 can have a diameter of about 10 mm and a length of between 110 mm and 210 mm. However, other cell dimensions are possible as well in accordance with various other embodiments. Other cell cross-sections (e.g., square, rectangular) are possible as well, in accordance with other alternative embodiments.

In accordance with an embodiment, the first electrode 120 is a sodium based negative anode and the second electrode body 130 is a nickel-chloride based positive cathode. The spacing between adjacent cells 110 can be between 0.5 mm to 5 mm, in accordance with certain embodiments. However, other spacings are possible as well, in accordance with other various embodiments. The total length of a row of cells 110 forming a cell module 100 is largely dependent on the diameter and spacing of the cells 110. Cell module lengths in the range of 250 mm to 500 mm may be typical, however.

In some embodiments, the chemistry of a cell is of the sodium-metal-halide type, where NaCl and Ni are converted to Na and $NiCl_2$ during battery charging. The energy capacity of a cell can range from about 2 amp*hours to about 250 amp*hours. The operating temperature range of the cells can range between about 270° C. and about 350° C., in accordance with various embodiments.

The cell module 100 further includes an electrically conductive elongate carrier element 140 having a first plurality of apertures 135 (e.g., circular apertures). Each aperture 135 is configured to accept a top portion of a second electrode body 130 of a cell 110 therethrough, that is, top portions of the second electrodes fit through the apertures, with the apertures being spaced apart from one another to correspond to the spacing between the cells. In accordance with an embodiment, the second electrode body 130 of each cell 110 is welded to the carrier element 140 at a corresponding aperture 135. Therefore, the carrier element 140 and the second electrode bodies 130 are at the same electrical potential (e.g., a positive potential). As used herein, the term "weld" refers to a connection using any technique that joins or bonds one piece of metal to another such as, for example, brazing and soldering.

In accordance with an embodiment, the carrier element 140 is in the form of a C-channel and may be made of one or more of mild steel, copper, beryllium, nickel, or another electrically conductive material, including alloys such as copper-beryllium. The C-channel configuration of the carrier element 140 may provide a higher bending strength (provide stiffening) than that of a flat strip and may also increase the conductive area. In accordance with other embodiments, the stiffened carrier element may be in a L-channel configuration. Other stiffened configurations may be possible as well. The relationship of the carrier element 140 and the second electrode bodies 130 allow for easy automated welding of each cell 110 to the carrier element 140. Alternatively, the carrier element 140 may be press fit to the second electrode body 130.

The cell module 100 also includes an elongate electrically insulating strip 150 having a second plurality of apertures 155 (e.g., circular apertures). Each aperture 155 is configured to accept a first electrode 120 of a cell 110 therethrough. The insulating strip 150 rests across the top portion of the second electrode body 130 of each cell 110 and the carrier element 140. In accordance with an embodiment, the insulating strip 150 is made of one or more of mica or another electrically insulating material.

The cell module 100 further includes an electrically conductive first electrode strip 160 having a third plurality of apertures 165 (e.g., circular apertures). Each aperture 165 is configured to accept a first electrode 120 of a cell 110 therethrough. Furthermore, the first electrode 120 of each cell 110 is welded to the first electrode strip 160 at a corresponding aperture 165. Alternatively, the first electrode 120 of each cell 110 may be press fit to the first electrode strip 160 at a corresponding aperture 165. Therefore, the first electrode strip 160 and the first electrodes 120 are at the same electrical potential (e.g., a negative potential), and the first electrode strip 160 is electrically insulated from the carrier element 140 via the insulating strip 150. In accordance with an embodiment, during assembly of a cell module, the carrier element 140, the insulating strip 150, and the first electrode strip 160 may be adhered together by a high temperature adhesive. Alternatively, the carrier element 140, the insulating strip 150, and the first electrode strip 160 may be pre-fabricated as a single layered element.

In accordance with an embodiment, the first electrode strip 160 is made of one or more of mild steel, copper, beryllium, nickel, or another electrically conductive material. As a result, the cells 110 of the cell module 100 are electrically connected in parallel. The relationship of the first electrode strip 160 and the first electrodes allow for easy automated welding of each cell 110 to the electrode strip 160. In accordance with a slightly altered embodiment, the carrier element 140 fits over the second electrodes 130, the insulating strip 150 fits over the second electrodes 130 on top of the carrier element 140, and the first electrode strip 160 fits over the first electrodes 120. Even though the module configuration described above results in the cells of the cell module being electrically connected in parallel, other configurations are possible as well, in accordance with other embodiments. Modifications of the arrangement of elements 140, 150, and 160 can be made to put the cells in series, for example. Then, for example, the modules can be electrically connected in parallel.

Figure 3:
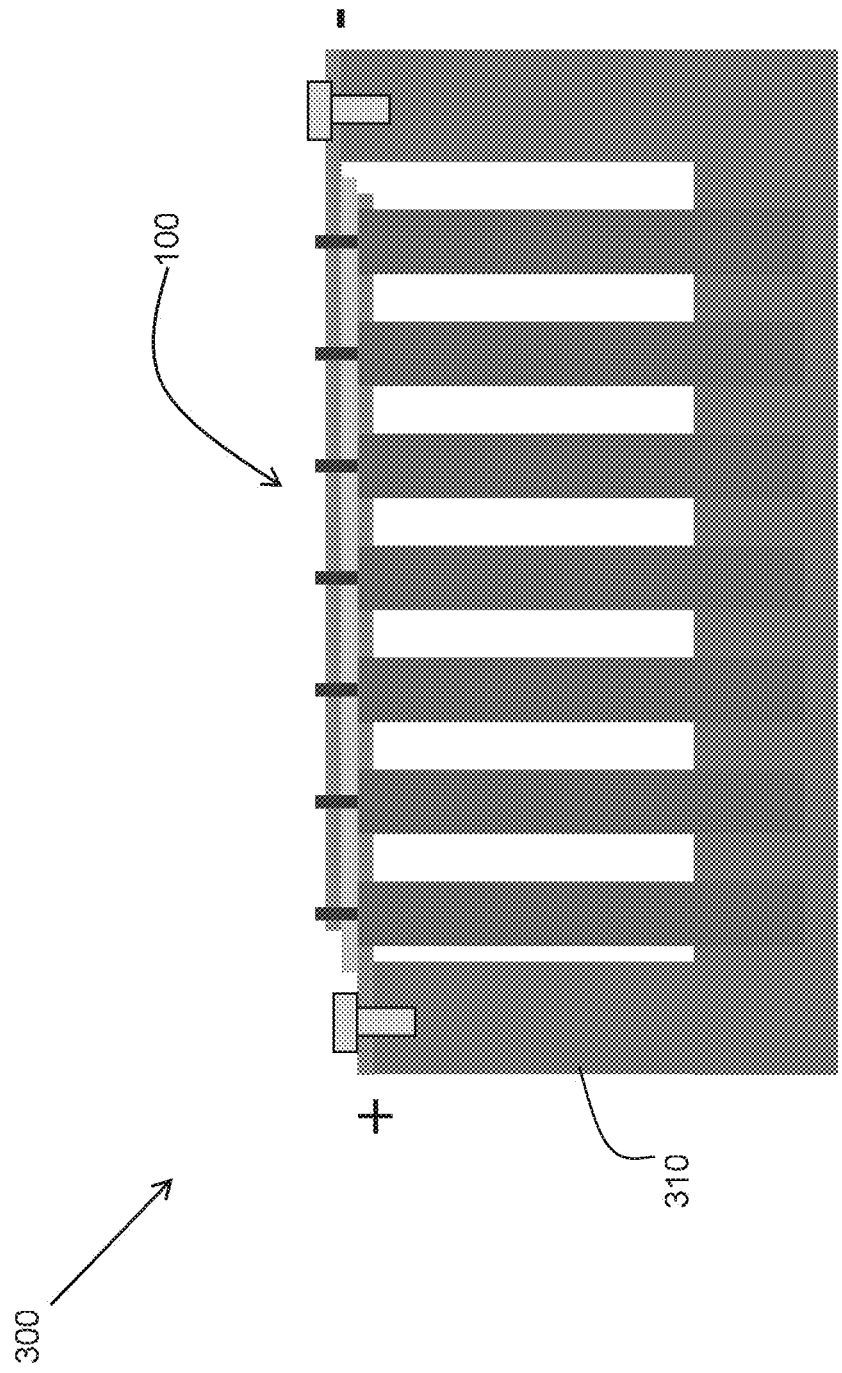
FIG. 3 is an illustration of a side view of a first embodiment of a modular cell tray apparatus having multiple cell modules of FIG. 1 installed in an electrically insulating cell tray.

FIG. 3 is an illustration of a side view of a first example embodiment of a modular cell tray apparatus 300 having multiple cell modules 100 of FIG. 1 installed in an electrically insulating cell tray 310. The cell tray 310 has multiple rows of cell receptacles where each row of cell receptacles is configured to receive and support at least a bottom portion of the cells 110 of a cell module 100. The cell tray 310 may be, for example, a porcelain enamel coated cell tray or an anodized aluminum coated cell tray. Other types of electrically insulating cell trays are possible as well. In accordance with an embodiment, the spaces between adjacent cells 110 may be available for cooling (e.g., cooling air flow).

Figure 4:
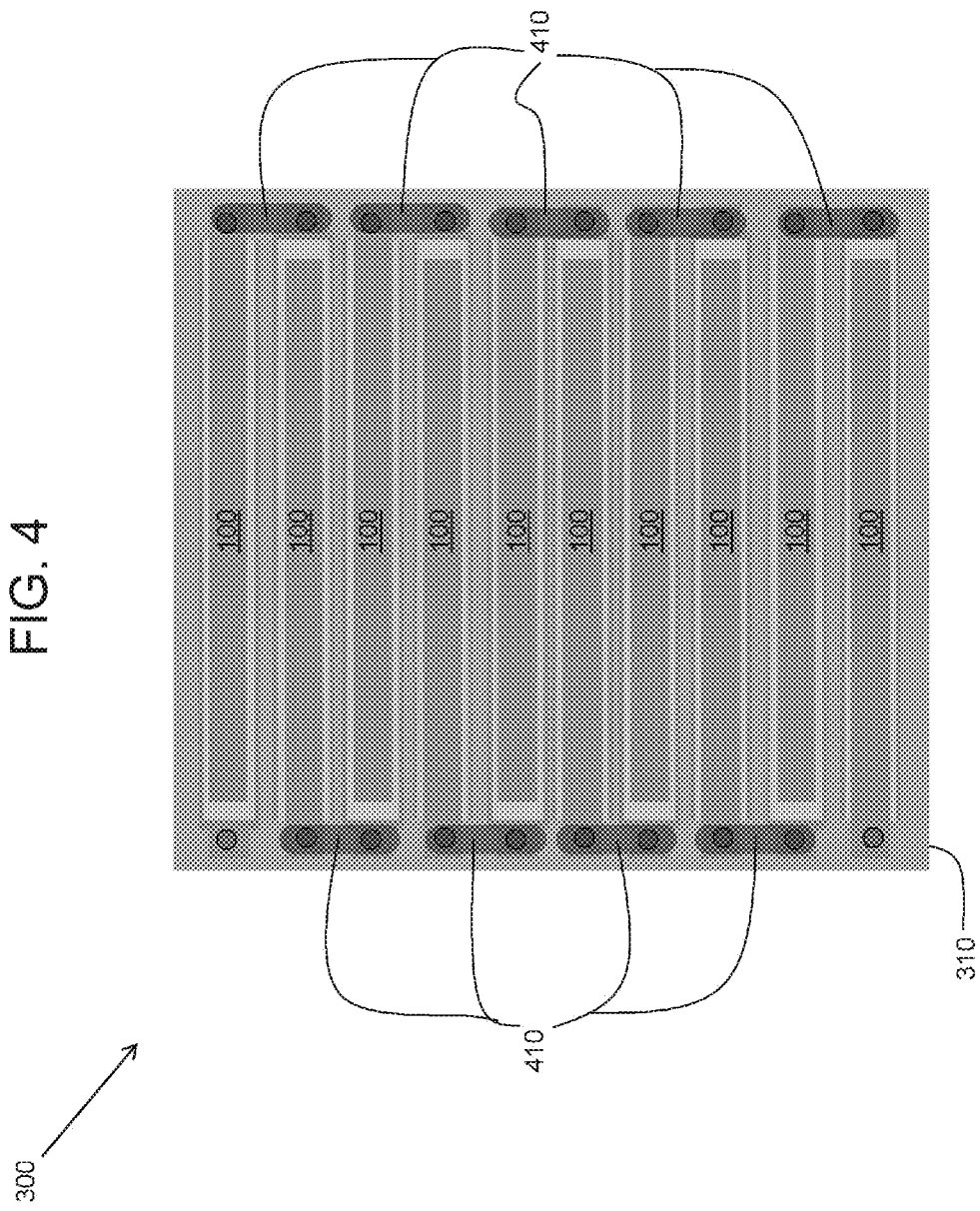
FIG. 4 is an illustration of a top view of the modular cell tray apparatus of FIG. 3 showing ten cell modules of FIG. 1 installed in the cell tray.

FIG. 4 is an illustration of a top view of the modular cell tray apparatus 300 of FIG. 3 showing ten cell modules 100 of FIG. 1 installed in the electrically insulating cell tray 310 having ten rows of cell receptacles with the cell modules 100 electrically connected together in series via a first plurality of conductive electrical connectors 410. The electrical connectors 410 are configured (e.g., in a Z-shape) to connect a positive potential contact to a negative potential contact which may be in different spatial planes, in accordance with an embodiment. In accordance with an embodiment, the electrical connectors 410 are welded to the terminals of the cell modules 100 to form the electrical connections.

Alternatively, the cell modules 100 may be arranged to be electrically connected in parallel by a plurality of conductive electrical connectors. As a further alternative, the cell modules 100 may be arranged to be electrically connected in some combination of series and parallel.

Figure 17A:
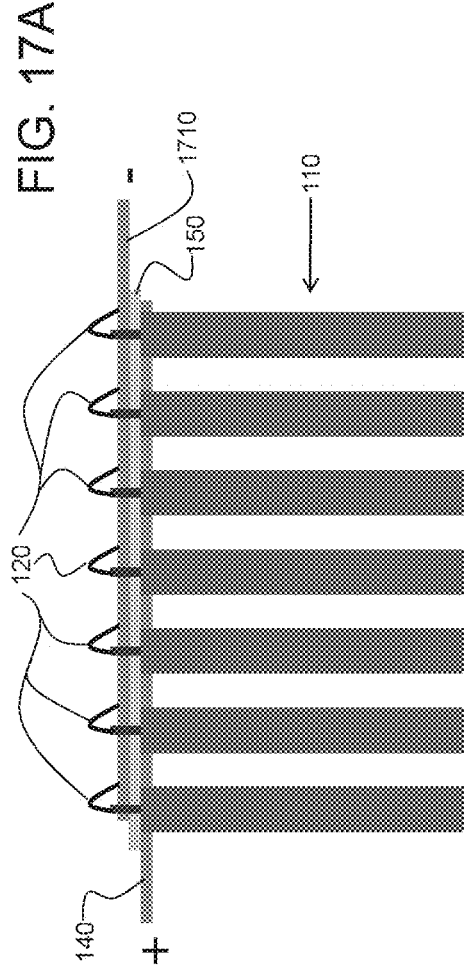
FIGS. 17A and 17B are illustrations of two views of an alternative embodiment of a cell module configuration for an electrochemical device.
Figure 17B:
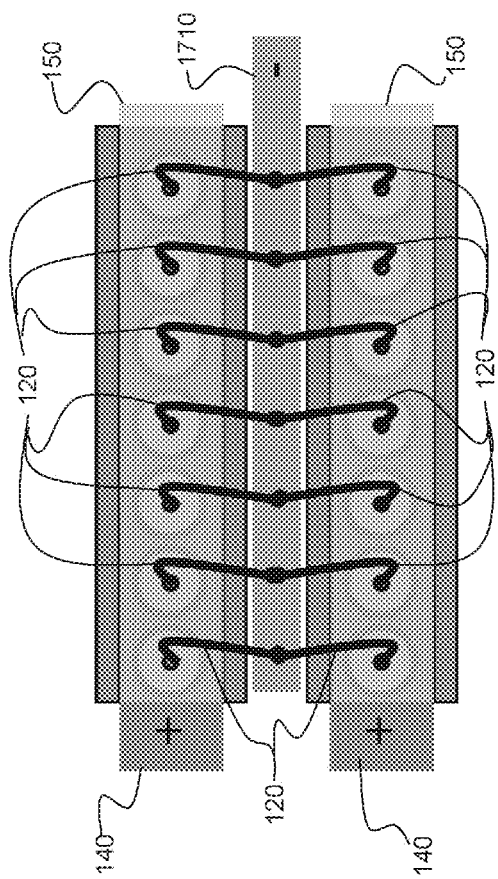

FIGS. 17A and 17B are illustrations of two views of an alternative example embodiment of a cell module configuration for an electrochemical device. In FIGS. 17A and 17B, the first anode electrodes 120 are each separately bended over and welded to a bus bar 1710 that runs between the cell modules. The bus bar 1710 replaces the first electrode strip 160, for example, in FIG. 1. As a result, a bus bar 1710 can be shared between two adjacent cell modules as shown in FIG. 17B. Referring to FIG. 4, instead of each of the ten cell modules having a first electrode strip 160 atop an insulating strip 150 for a total of ten first electrode strips 160, each adjacent pair of cell modules can have a bus bar 1710 therebetween for a total of five bus bars 1710. Therefore, the potential to save material in the electrochemical device is provided.

Figure 5:
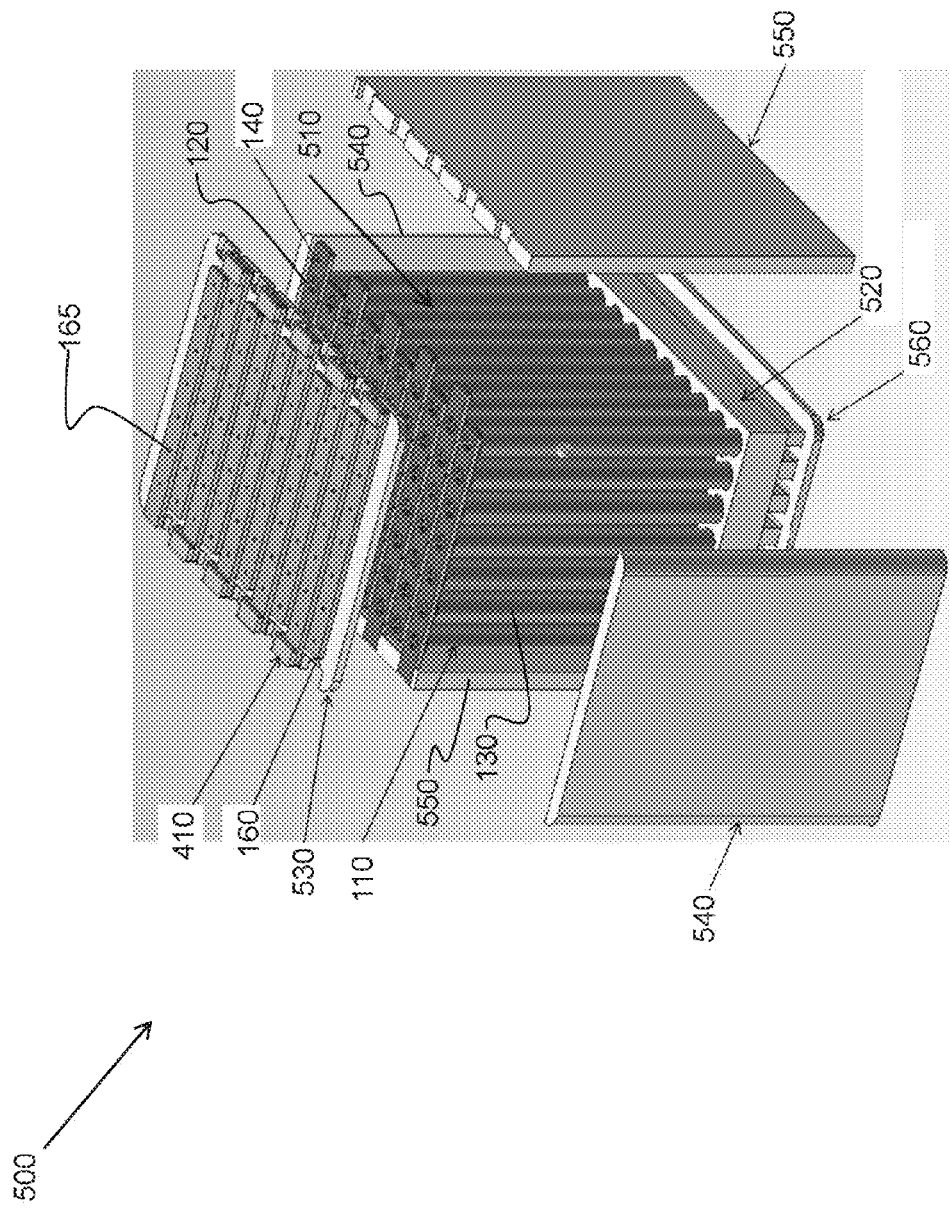
FIG. 5 is an illustration of an exploded view of a second embodiment of a modular cell tray apparatus having multiple cell modules installed in an electrically insulating cell tray.

FIG. 5 is an illustration of an exploded view of a second example embodiment of a modular cell tray apparatus 500 having multiple (ten) cell modules 510 installed in an electrically insulating cell tray 520. The cell modules 510 are similar to the cell modules 100 of FIG. 1, and each module includes a plurality of electrochemical cells 110 each having a first electrode 120 and a second electrode body 130. Also, each cell module 510 has an electrically conductive carrier element 140 as in FIG. 1.

However, instead of each cell module 510 having a separate electrically insulating strip 160, a single electrically insulating sheet 530 is provided which is shared by all of the cell modules 510. The insulating sheet 530 rests on top of the cell modules 510 and has a plurality of apertures 155 where each aperture 155 is configured to accept a first electrode 120 of a cell 110 therethrough.

The cell tray apparatus 500 also includes a plurality of electrically conductive first electrode strips 160 similar to FIG. 1. The electrode strips 160 each have a plurality of apertures 165 where each aperture 165 is configured to accept a first electrode 120 of a cell 110 therethrough. The first electrode 120 of each cell is welded to a corresponding first electrode strip 160 at a corresponding aperture 165. As a result, the first electrode strips 160 are electrically insulated from the second electrode bodies 130 of the cells 110 by the insulating sheet 530. Again, as a result, the cells 110 of each cell module 510 are electrically connected in parallel.

The ten cell modules 510 of FIG. 5 are shown as being electrically connected together in series via a first plurality of conductive electrical connectors 410, similar to FIG. 4. Alternatively, the cell modules 510 may be arranged to be electrically connected in parallel by a plurality of conductive electrical connectors. As a further alternative, the cell modules 510 may be arranged to be electrically connected in some combination of series and parallel.

Figure 6:
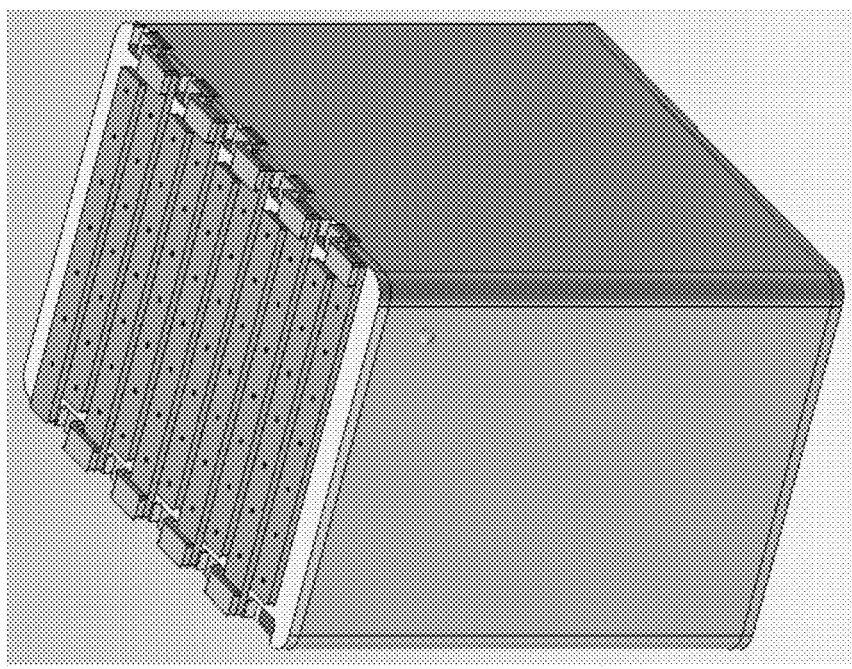
FIG. 6 illustrates an unexploded view of the modular cell tray apparatus of FIG. 5.

The modular cell tray apparatus 500 also includes two end plates 540, two side plates 550, and a sump plate 560 to encase all sides of the configuration of cell modules 510 except for the top portion. The plates 540, 550, and 560 may be both thermally and electrically non-conductive, in accordance with an embodiment. The cell tray 520 and/or the sump plate 560 can be made of a material of low thermal conductivity (e.g., fiberglass, wood, a composite material) to keep heat from escaping the modular cell tray apparatus 500 through the bottom. In accordance with an embodiment, the term "low thermal conductivity" refers to a thermal conductivity level that is at or below 1 W/mK (watts per meter kelvin). In accordance with another embodiment, the plates 540, 550, and 560 may be electrically non-conductive and thermally conductive. FIG. 6 illustrates an unexploded view of the modular cell tray apparatus 500 of FIG. 5.

Figure 7:
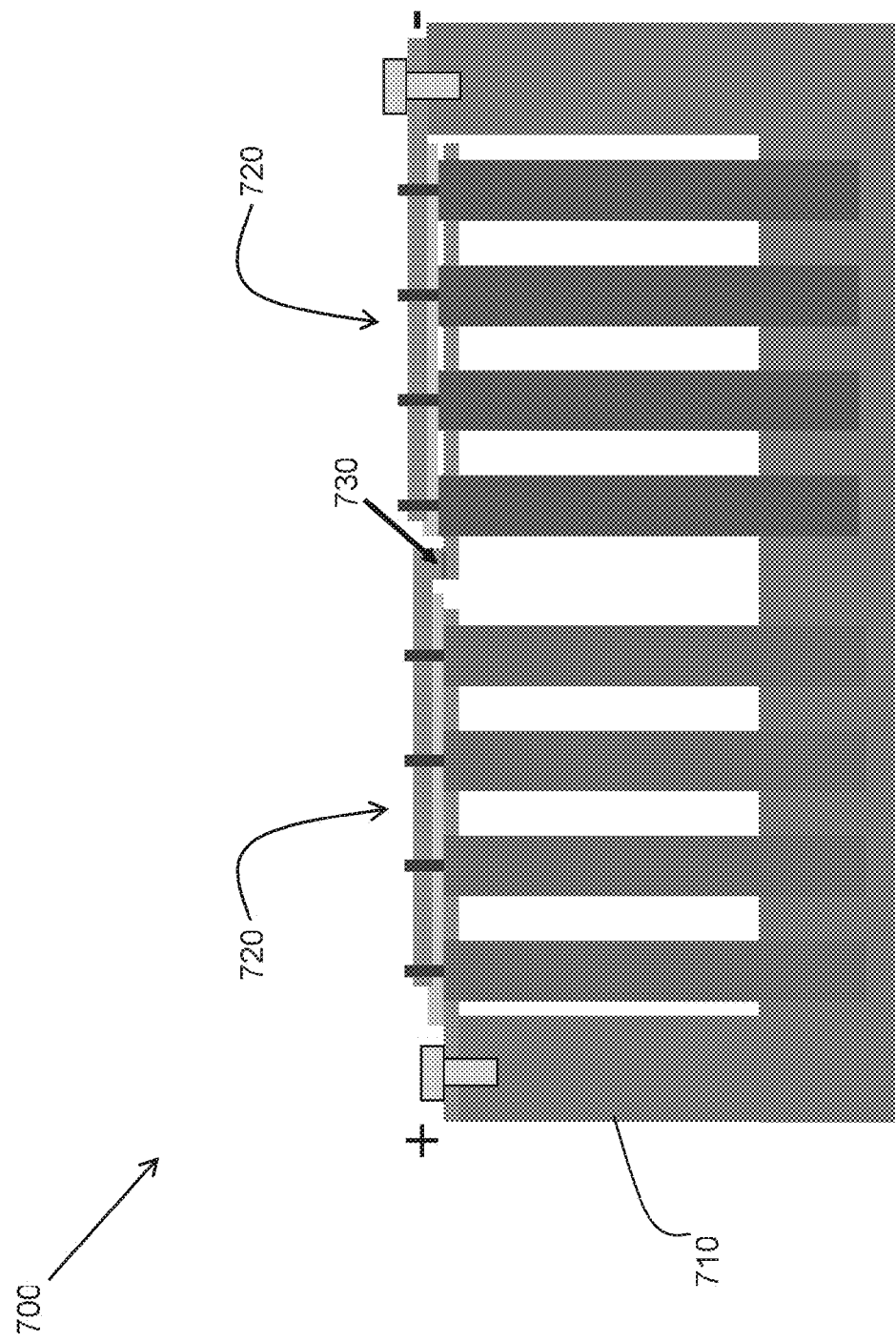
FIG. 7 illustrates a side view of a modular cell tray apparatus having rows of cell receptacles in a cell tray where each row is populated by a pair of cell modules each having four cells.

In accordance with an alternative embodiment, FIG. 7 illustrates a side view of a modular cell tray apparatus 700 having rows of cell receptacles in a cell tray 710 where each row is populated by a pair of cell modules 720 each having four cells. The pair of cell modules 720 are electrically connected in series by welding the negative output of a first cell module 720 to a positive output of a second cell module 720 at a welding joint 730. In such a configuration, the individual cell modules 720 can be manufactured with fewer cells (e.g. four) than would be needed for a cell module having enough cells (e.g., eight) to populate an entire row of the cell tray apparatus 700. As a result, a larger modular cell tray apparatus can be configured from the same smaller cell modules. Note that the concept can be extended to rows having three or more cell modules, in accordance with various other embodiments.

Figure 8:
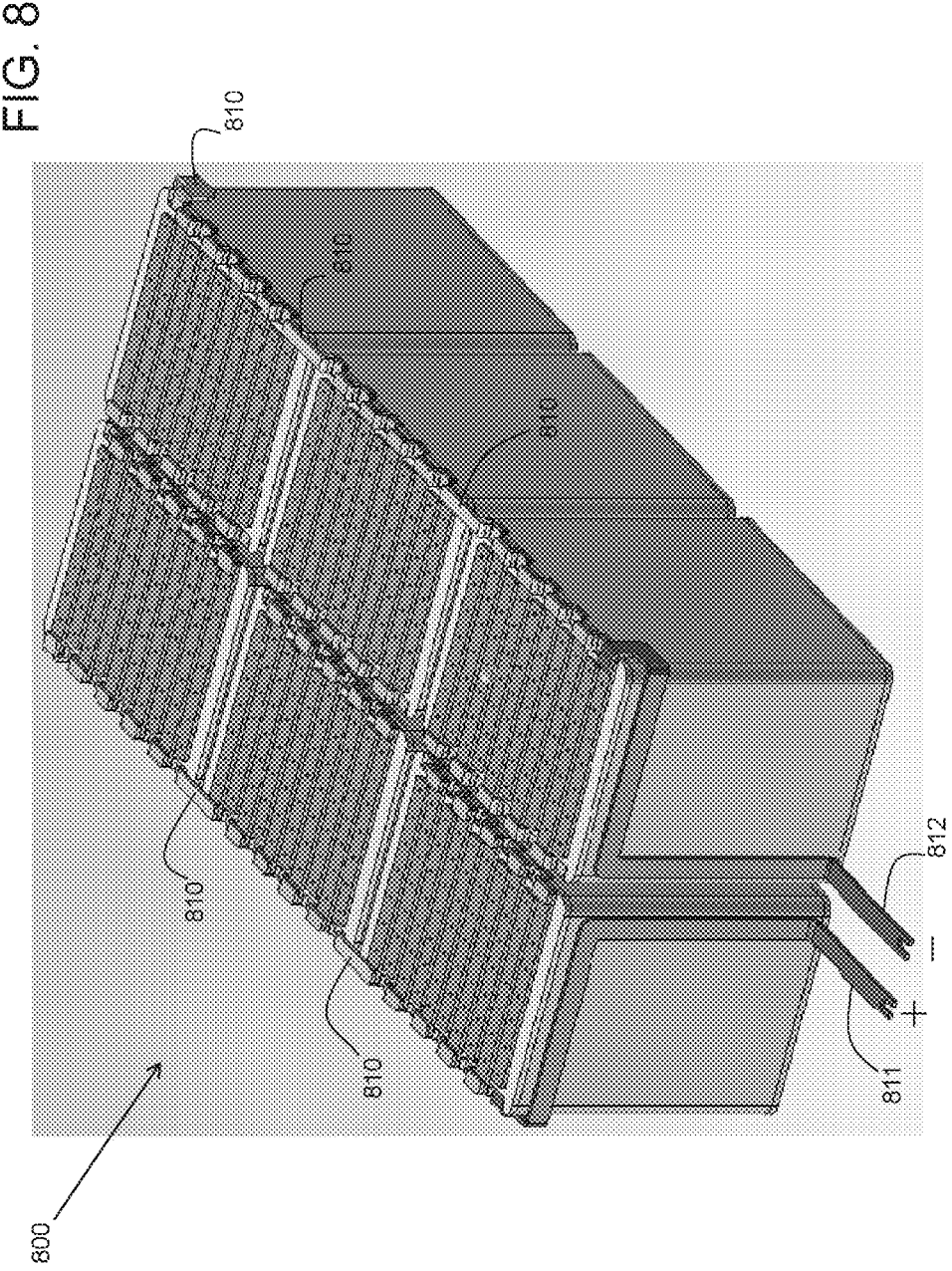
FIG. 8 is an illustration of a perspective view of an embodiment of a modular electrochemical device including a plurality of the modular cell tray apparatuses of FIG. 6.

FIG. 8 is an illustration of a perspective view of an example embodiment of a modular electrochemical device 800 including a plurality of the modular cell tray apparatuses 500 of FIG. 6. In addition to the first set of electrical connectors 410 electrically connecting the cell modules within a cell tray apparatus (see FIG. 5), a second set of electrical connectors 810 are provided, which are used to electrically connect the modular cell tray apparatuses to each other in series to form the modular electrochemical device 800. Bus bar elements 811 and 812 are also connected to the front of the modular electrochemical device 800 to provide access to the total positive and negative electrical potentials, respectively.

In accordance with an embodiment, the electrical connectors 810 may be configured as breakable socket connectors. That is, the connectors 810 may be readily connectable to and dis-connectable from the modular cell tray apparatuses 500 instead of being welded, for example. Such breakable socket connectors 810 provide for easier assembly and disassembly of a modular electrochemical device 800. In accordance with an embodiment, the breakable socket connectors 810 are configured such that one modular cell tray apparatus 500 is able to be effectively plugged into another such that modular cell tray apparatuses may be easily switched in and out of a modular electrochemical device.

In accordance with an alternative embodiment, the electrical connectors 810 may be flexible connectors (e.g., flat, stranded conductors) which are welded to the terminals of the modular cell tray apparatuses 500. Such welded flexible connectors 810 provide more reliability of the modular electrochemical device 800 by allowing for a certain amount of movement of the modular cell tray apparatuses 500 with respect to each other due to, for example, vibration without breaking the electrical connections between the apparatuses 500. With flexible connectors, each cell tray apparatus is able to move with respect to other cell tray apparatuses without causing large stresses. Such flexible connectors may be especially useful in mobile applications.

Figure 9:
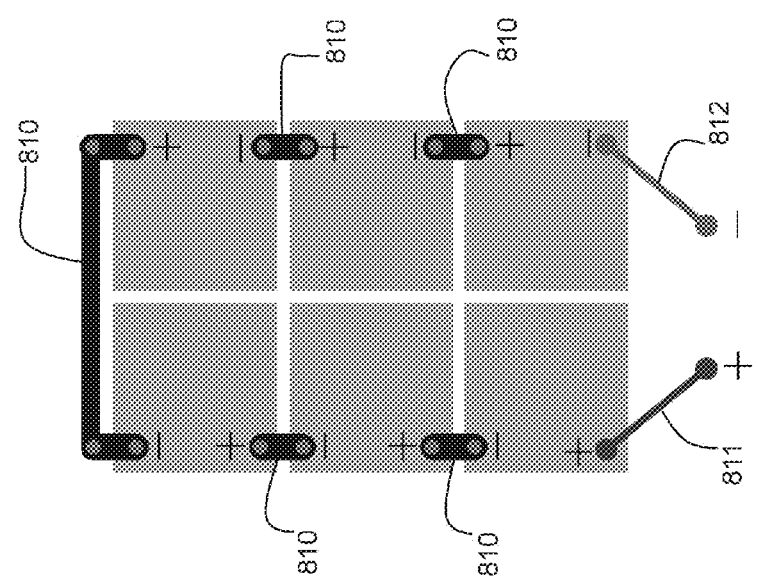
FIG. 9 is an illustration of a top view of the modular electrochemical device of FIG. 8, more clearly showing the electrical connections from one modular cell tray apparatus to another.

FIG. 9 is an illustration of a top view of the modular electrochemical device 800 of FIG. 8, clearly showing the electrical connections from one modular cell tray apparatus 500 to another. As an example, each cell module 510 in a cell tray apparatus 500 may provide a potential of 2.5 VDC. Since there are ten cell modules 510 connected in series in each cell tray apparatus 500, each cell tray apparatus 500 provides a potential of 25 VDC. Since there are six cell tray apparatuses 500 connected in series in the modular electrochemical device 800, the modular electrochemical device 800 provides a potential of 150 VDC between the bus bar elements 811 and 812.

Figure 10:
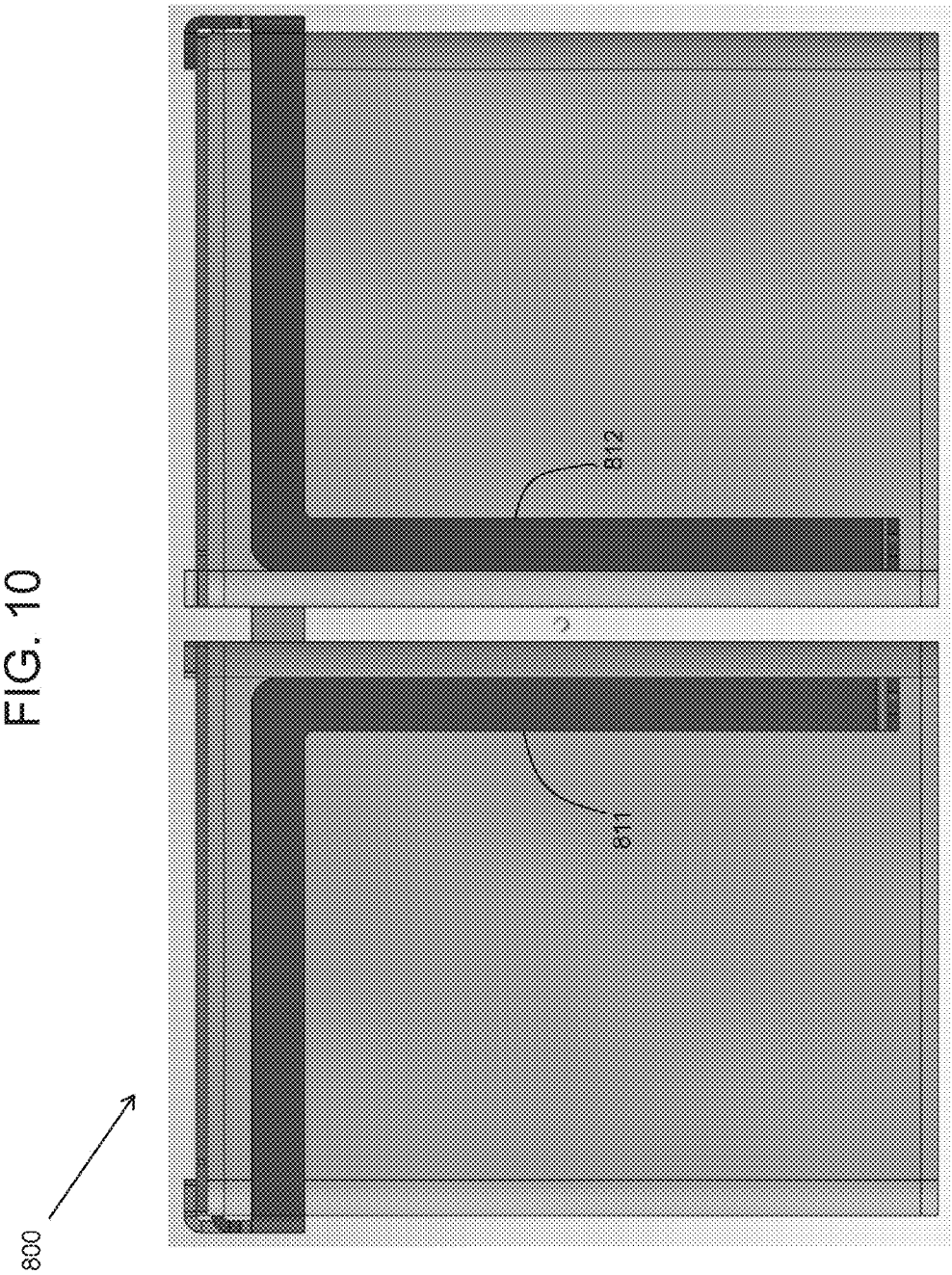
FIG. 10 is an illustration of a front view of the modular electrochemical device of FIG. 8.
Figure 11:
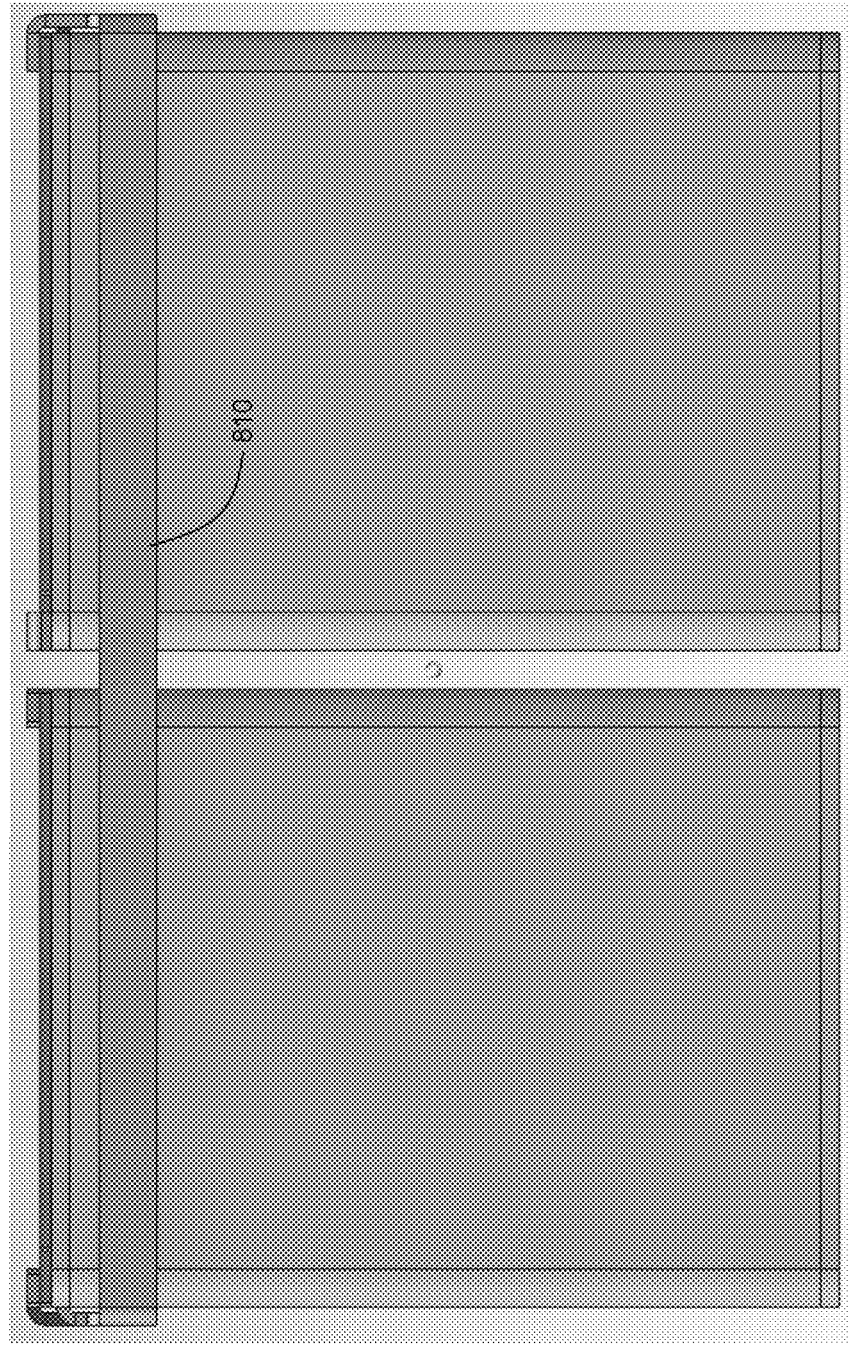
FIG. 11 is an illustration of a rear view of the modular electrochemical device of FIG. 8.
Figure 12:
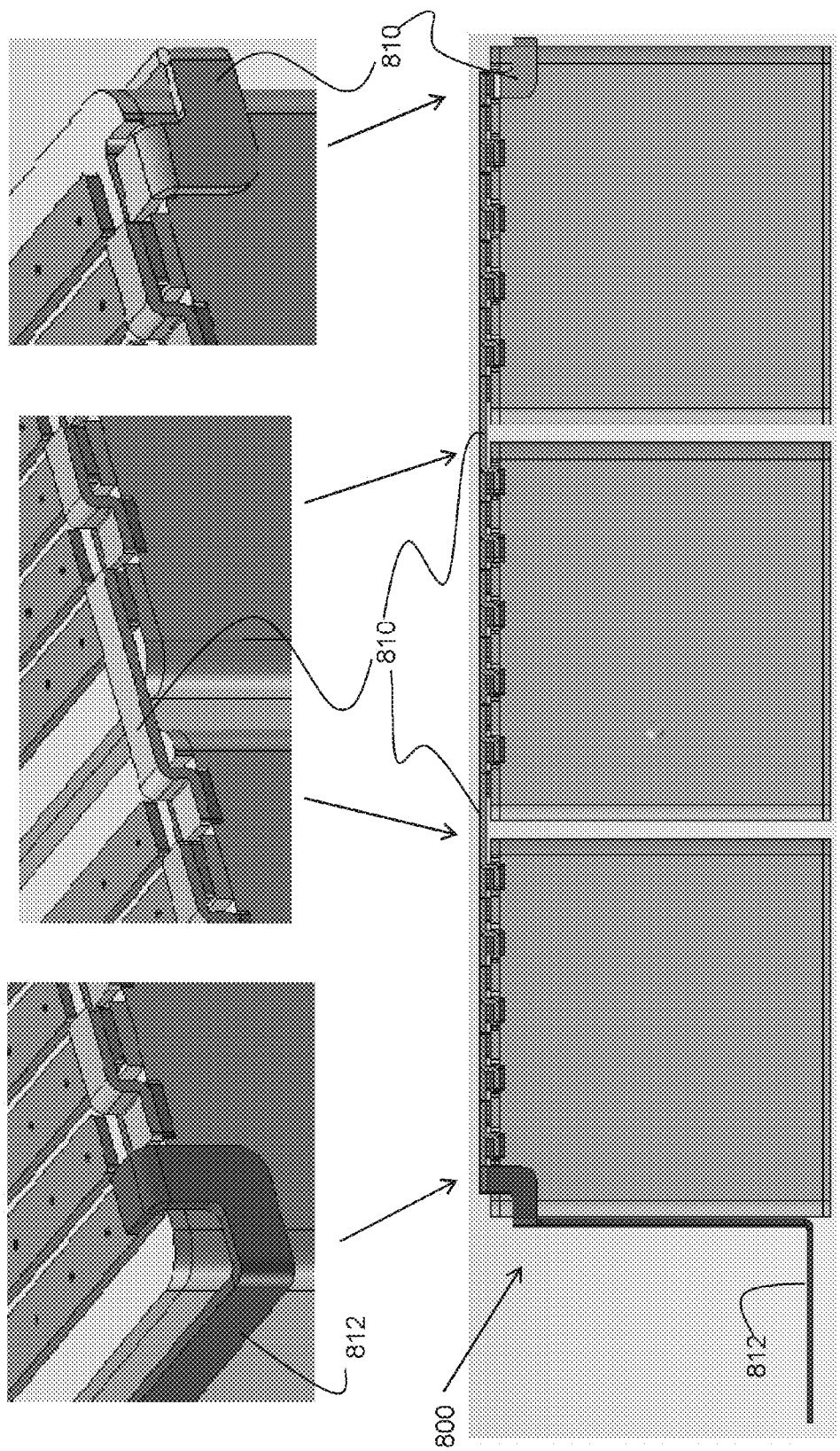
FIG. 12 is an illustration of a side view of the modular electrochemical device of FIG. 8, including enhanced perspective views showing the various types of electrical connections.

FIG. 10 is an illustration of a front view of the modular electrochemical device 800 of FIG. 8. FIG. 11 is an illustration of a rear view of the modular electrochemical device 800 of FIG. 8. FIG. 12 is an illustration of a side view of the modular electrochemical device 800 of FIG. 8, including enhanced perspective views showing the various types of electrical connections. The electrical connectors 810 are configured (e.g., in a Z-shape) to connect a positive potential contact to a negative potential contact which may be in different spatial planes, in accordance with an embodiment.

Alternatively, the modular cell tray apparatuses 500 may be arranged to be electrically connected in parallel by a plurality of conductive electrical connectors. As a further alternative, the modular cell tray apparatuses 500 may be arranged to be electrically connected in some combination of series and parallel.

Figure 13:
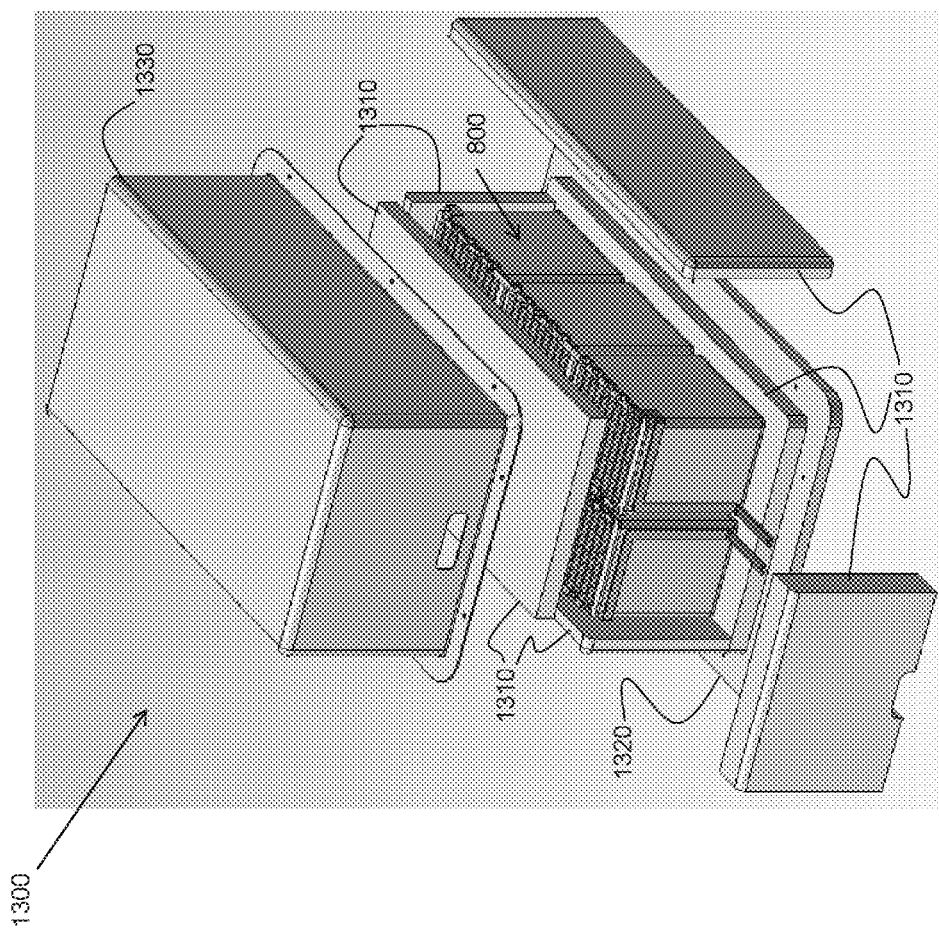
FIG. 13 is an illustration of a perspective exploded view of an embodiment of an enclosed modular electrochemical device having the modular electrochemical device therein.

FIG. 13 is an illustration of a perspective exploded view of an embodiment of an enclosed modular electrochemical device 1300 having the modular electrochemical device 800 therein. The electrochemical device 1300 includes side, top, and bottom insulating panels 1310 configured to thermally enclose the device 800, but allowing for the bus bar elements 811 and 812 to exit therethrough. The panels 1310 may be vacuum insulated panels (VIP), for example, or some other type of thermally insulating panels.

Figure 14A:
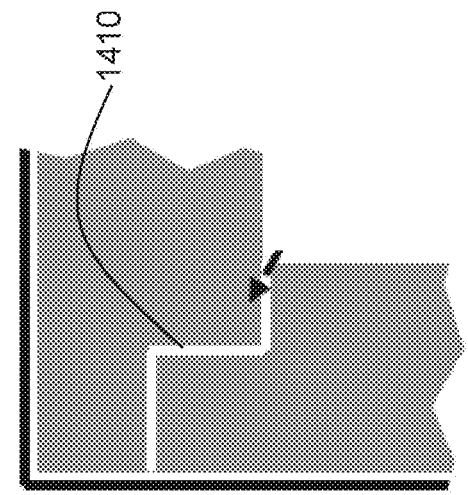
FIGS. 14A and 14B are illustrations showing two exemplary embodiments of "rabbit" joints.
Figure 14B:
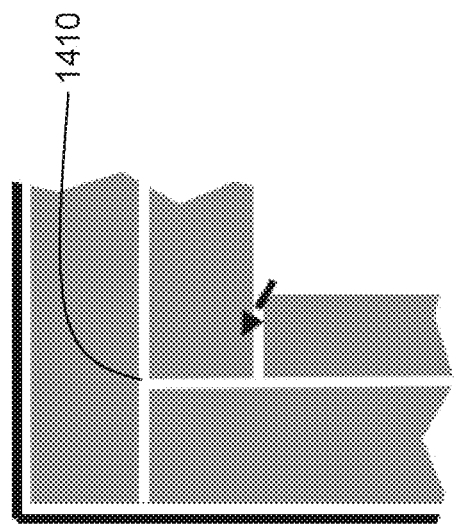

The panels 1310 may include "rabbit" joints, in accordance with an embodiment. "Rabbit" joints are beveled cuts in the corners of the insulating panels which reduce the optical path between the interior of the device 1300 and the exterior of the device 1300 by reducing the radiation heat transfer paths at the corners. "Rabbit" joints reduce infrared radiation heat loss from a relatively hot interior region to a relatively cold exterior region by preventing a direct line-of-site from the interior region to the exterior region. FIGS. 14A and 14B are illustrations showing two example embodiments of "rabbit" joints 1410.

Figure 15:
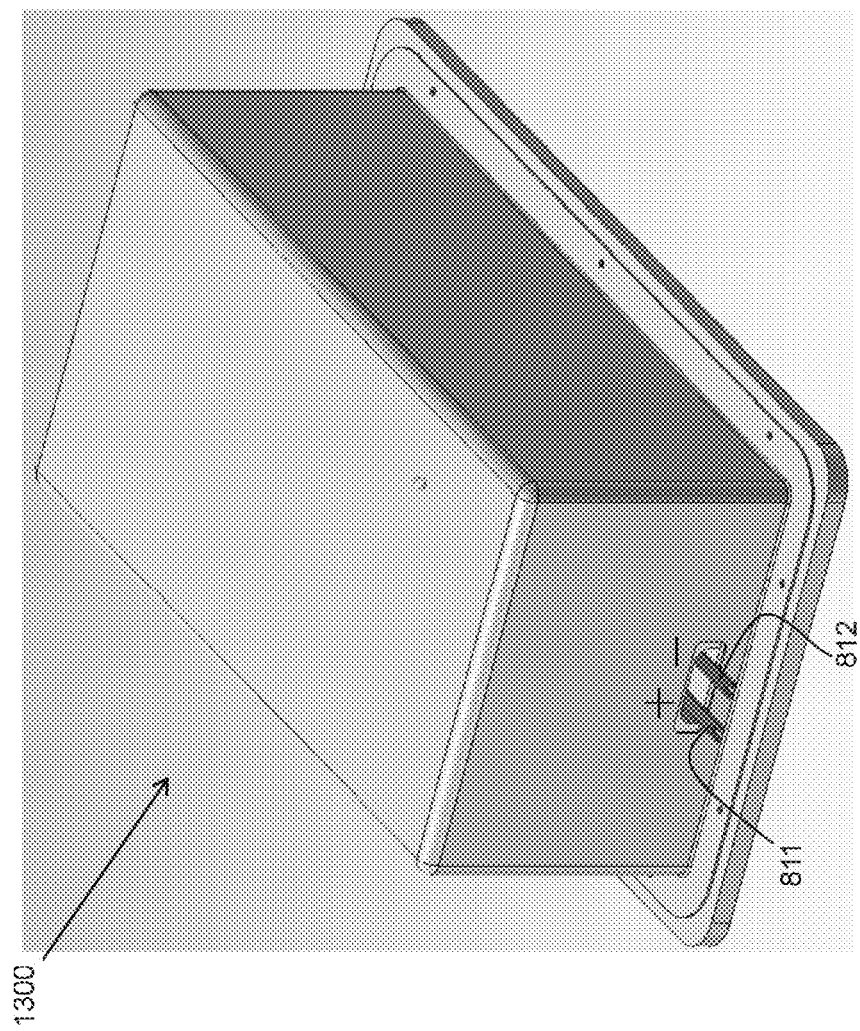
FIG. 15 is an illustration of an unexploded view of the enclosed modular electrochemical device of FIG. 13.

The enclosed modular electrochemical device 1300 also includes a base plate 1320 supporting the modular cell tray apparatuses 500 of the modular electrochemical device 800 beneath the bottom insulating panel 1310 as shown in FIG. 13. The base plate may be made of a low thermal conductivity material such as, for example, G11 fiberglass composite or wood. The enclosed modular electrochemical device 1300 further includes a cover or lid 1330 configured to drop down over the modular electrochemical device 800 and the surrounding insulating panels 1310 and attach to the base plate 1320. The cover 1330 may attach to the baseplate 1320 via screws or bolts, for example. The cover 1330 is further configured to allow for the bus bar elements 811 and 812 to exit therethrough. FIG. 15 is an illustration of an unexploded view of the enclosed modular electrochemical device 1300 of FIG. 13.

Furthermore, in accordance with an embodiment, the interior and/or exterior surfaces of the base plate 1320 and the cover 1330 may be coated with a low emissivity coating which is a coating that reduces heat loss versus not using the coating. Such a coating reduces the amount of radiative heat loss from the surfaces of the enclosed modular electrochemical device 1300. In accordance with an embodiment, the term "low emissivity" refers to an emissivity level that is at or below 0.2. Viable coatings may include, for example, chromium, nickel, or aluminum that are electroplated to the surfaces or are applied to the surfaces in the form of a foil. For external surfaces, a low emissivity coating can reduce heat transfer to ambient and, therefore, can reduce steady state heat loss from the electrochemical device 1300. For internal surfaces, which face the cells 110, the coated surfaces can reflect infrared radiation back toward the cells and minimize radiated heat transfer.

As an alternative, the cover 1330 may be a vacuum lid top hat (the top hat has a top portion and side portions, but not a bottom portion) that fits down over the internal elements of the device 1300 and is welded to the base plate 1320 forming a sealed space therein such that a vacuum may be formed inside the device 1300. The vacuum may be formed by actively pulling air out of the sealed space, for example, via a pump device. In such an alternative embodiment, the panels 1310 may be eliminated.

The modular electrochemical device 1300 may further includes a battery management system (BMS) 1610 configured to be mounted to the cover 1330, or the base plate 1320 as shown in FIG. 16, (e.g., via bolts) and to operatively interface with components disposed within the modular electrochemical device 1300 (e.g., via bus bar elements, control signal electrical leads, monitored parameter electrical leads, voltage sensing wires, heater leads, etc., which are routed through the insulating panels 1310). The bus bar elements 811 and 812 can be insulated solid metal leads (e.g., flat or round), or insulated cables that are stranded and flexible, in accordance with certain embodiments.

In accordance with an embodiment, certain leads and wires can be routed through cooling channels of the modular electrochemical device 1300 (e.g., cooling channels of the modular cell tray apparatuses 500) to provide access for measurement of internal parameters of the modular electrochemical device 1300. For example, a resistive thermal device (RTD) or thermocouple can be located within the modular electrochemical device 1300 for the purpose of measuring temperature. Wires from the RTD can be routed through cooling channels and out to the BMS. In accordance with an alternative embodiment, a dedicated channel that is not used for cooling can be configured within the modular electrochemical device 1300 to provide access for measurement of internal parameters. The BMS is the controller of the modular electrochemical device 1300 and serves to control temperature of the device 1300 and the charging and discharging of the device 1300.

In the appended claims, the terms "including" and "having" are used as the plain language equivalents of the term "comprising"; the term "in which" is equivalent to "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differentiate from the literal language of the claims, or if they include equivalent structural elements with insubstantial differences from the literal language of the claims.

What is claimed is:

1. A cell module for an electrochemical device, comprising:
    a plurality of electrochemical cells, the cells each having a first electrode protruding out of a top portion of a body of a second electrode; and
    an electrically conductive elongate carrier element having a first plurality of apertures, wherein the first plurality of apertures are configured to respectively accept the top portions of the second electrode bodies therethrough, and wherein the second electrode body of each cell is welded to the carrier element at a corresponding aperture of the first plurality of apertures.

2. The cell module according to claim 1, wherein the carrier element is configured as one of a C-channel and an L-channel.

3. The cell module according to claim 1, wherein the carrier element comprises mild steel.

4. The cell module according to claim 1, wherein the carrier element comprises one or more of copper, beryllium, or nickel.

5. The cell module according to claim 1, further comprising an elongate electrically insulating strip having a second plurality of apertures, wherein the apertures of the second plurality of apertures are configured to respectively accept the first electrodes of the plurality of cells therethrough, and wherein the elongate electrically insulating strip is configured to rest across the top portions of the second electrode bodies of the plurality of cells and the carrier element.

6. The cell module according to claim 5, wherein the insulating strip comprises mica.

7. The cell module according to claim 5, further comprising an electrically conductive first electrode strip having a third plurality of apertures, wherein the apertures of the third plurality of apertures are configured to respectively accept the first electrodes of the plurality of cells therethrough, and wherein the first electrode of each cell is welded to the first electrode strip at a corresponding aperture of the third plurality of apertures, and wherein the first electrode strip is electrically insulated from the carrier element via the insulating strip.

8. The cell module according to claim 7, wherein the first electrode strip comprises one or more of mild steel, copper, beryllium, or nickel.

9. A modular cell tray apparatus for an electrochemical device, comprising:
    a plurality of the cell modules of claim 1; and
    an electrically insulating tray having rows of cell receptacles, each row of cell receptacles configured to receive and support at least a bottom portion of the cells of a respective one of the plurality of cell modules.

10. The cell tray apparatus according to claim 9, further comprising an electrically insulating sheet having a second plurality of apertures, wherein the apertures of the second plurality of apertures are configured to respectively accept the first electrodes of the plurality of cell modules therethrough, and wherein the electrically insulating sheet is configured to rest across top portions of the plurality of cell modules.

11. The cell tray apparatus according to claim 10, further comprising a plurality of electrically conductive first electrode strips each having a third plurality of apertures, wherein the apertures of the third plurality of apertures are configured to respectively accept the first electrodes of the plurality of cell modules therethrough, and wherein the first electrodes are welded to the plurality of first electrode strips at corresponding apertures of the third plurality of apertures, and wherein the first electrode strips are electrically insulated from the second electrode bodies of the cells via the insulating sheet.

12. The cell tray apparatus according to claim 9, further comprising:
    a sump plate positioned below the electrically insulating tray; and
    a plurality of side plates positioned along outer side portions of the plurality of cell modules, wherein the sump plate and the plurality of side plates form an uncovered housing of the cell tray apparatus.

13. The cell tray apparatus according to claim 12, further comprising a plurality of electrical connectors configured to electrically connect the plurality of cell modules in series.

14. The cell tray apparatus according to claim 12, further comprising a plurality of electrical connectors configured to electrically connect the plurality of cell modules in parallel.

15. A modular electrochemical device, comprising:
    a plurality of the cell tray apparatuses of claim 9;
    a first plurality of electrical connectors configured to electrically connect the plurality of cell modules within each cell tray apparatus of the plurality of cell tray apparatuses; and
    a second plurality of electrical connectors configured to electrically connect the plurality of cell tray apparatuses.

16. The electrochemical device according to claim 15, wherein the second plurality of electrical connectors are configured to electrically connect the plurality of cell tray apparatuses in series.

17. The electrochemical device according to claim 15, wherein the second plurality of electrical connectors are configured to electrically connect the plurality of cell tray apparatuses in parallel.

18. The electrochemical device according to claim 15, wherein the second plurality of electrical connectors are configured as breakable socket connectors.

19. The electrochemical device according to claim 15, wherein the second plurality of electrical connectors are configured as welded flexible connectors.

20. The electrochemical device according to claim 15, further comprising:
    a first bus bar element routing a negative potential of the plurality of the cell tray apparatuses away from the plurality of cell tray apparatuses; and
    a second bus bar element routing a positive potential of the plurality of the cell tray apparatuses away from the plurality of cell tray apparatuses.

21. The electrochemical device according to claim 15, further comprising:
    a plurality of insulating panels positioned along outer side portions of the plurality of cell tray apparatuses;
    a base plate positioned adjacent to one of the plurality of insulating panels and configured to support the plurality of cell tray apparatuses; and a lid configured to cover the plurality of cell tray apparatuses and attach to the base plate.

22. The electrochemical device according to claim 21, wherein the lid is coated with a low emissivity coating, and wherein adjacent panels of the plurality of insulating panels form rabbit joints, and wherein the base plate is made of a low thermal conductivity material.

23. The electrochemical device according to claim 21, further comprising a battery management system mounted on the base plate.

24. The electrochemical device according to claim 21, wherein the plurality of insulating panels are vacuum insulated panels.

25. The electrochemical device according to claim 21, wherein the lid is configured as a vacuum lid top hat.

26. A cell module, comprising:
a plurality of electrochemical cells having plural first electrodes and plural second electrodes, each electrochemical cell having one of the first electrodes and one of the second electrodes at an end of the cell, wherein the second electrode extends from the first electrode at the end of the cell on each of the electrochemical cells; and
an electrically conductive carrier element having a first plurality of apertures, wherein the apertures are spaced and sized to receive the second electrodes through the apertures, the carrier element electrically insulated from the first electrodes;
wherein the second electrodes are welded to the carrier element at respective apertures of the plurality of apertures.

27. A modular cell tray apparatus, comprising:
a plurality of the cell modules of claim 26; and
an electrically insulating tray having plural rows of cell receptacles, each row of cell receptacles configured to receive and support at least a bottom portion of the electrochemical cells of one of the plurality of cell modules.

28. A modular electrochemical device, comprising:
a plurality of the cell tray apparatuses of claim 27;
a first plurality of electrical connectors configured to electrically connect the plurality of cell modules within each cell tray apparatus of the plurality of cell tray apparatuses; and
a second plurality of electrical connectors configured to electrically connect the plurality of cell tray apparatuses.

29. The electrochemical device of claim 28, further comprising:
a plurality of insulating panels positioned along outer side portions of the plurality of cell tray apparatuses;
a base plate positioned adjacent to one of the plurality of insulating panels and configured to support the plurality of cell tray apparatuses; and
a lid configured to cover the plurality of cell tray apparatuses and attach to the base plate.

30. A cell module, comprising:
a plurality of electrochemical cells having plural first electrodes and plural second electrodes, each electrochemical cell having one of the first electrodes and one of the second electrodes at an end of the cell;
an electrically conductive carrier having a first plurality of apertures, wherein the apertures of the first plurality of apertures are spaced and sized to receive the second electrodes therethrough, wherein the second electrodes are welded to the carrier at respective apertures of the first plurality of apertures;
an electrically insulating first strip having a second plurality of apertures, wherein the apertures of the second plurality of apertures are spaced and sized to receive the first electrodes or the second electrodes therethrough; and
an electrically conductive second strip having a third plurality of apertures, wherein the apertures of the third plurality of apertures are spaced and sized to receive the first electrodes therethrough, wherein the first electrodes are welded to the second strip at respective apertures of the third plurality of apertures, and wherein the second strip is electrically insulated from the carrier by the first strip.

31. A cell module, comprising:
a plurality of electrochemical cells having plural first electrodes and plural second electrodes, each electrochemical cell having one of the first electrodes and one of the second electrodes at an end of the cell;
an electrically conductive carrier element having a first plurality of apertures, wherein the apertures are spaced and sized to receive the second electrodes through the apertures, and wherein the second electrodes are welded to the carrier elements at respective apertures of the plurality of apertures;
an electrically insulating strip having a second plurality of apertures, wherein the apertures of the second plurality of apertures are configured to respectively accept the first electrodes of the plurality of cells therethrough, and wherein the electrically insulating strip is configured to rest across the top portions of the second electrodes of the plurality of cells and the carrier element; and
an electrically conductive first electrode strip having a third plurality of apertures, wherein the apertures of the third plurality of apertures are configured to respectively accept the first electrodes of the plurality of cells therethrough, and wherein the first electrode of each cell is welded to the first electrode strip at a corresponding aperture of the third plurality of apertures, and wherein the first electrode strip is electrically insulated from the carrier element via the insulating strip.

* * * * *